United States Patent [19]
Colcombet et al.

[11] Patent Number: 5,839,478
[45] Date of Patent: Nov. 24, 1998

[54] COLD-FORMABLE COMPOSITE PIPE

[75] Inventors: Thierry Colcombet, St Cyr Au Mont D'Or; Alain Grandouiller, Saint-Etienne, both of France

[73] Assignee: M.R. Industries, Saint Chamond, France

[21] Appl. No.: 696,942

[22] PCT Filed: Feb. 22, 1995

[86] PCT No.: PCT/FR95/00210

§ 371 Date: Sep. 23, 1996

§ 102(e) Date: Sep. 23, 1996

[87] PCT Pub. No.: WO95/22712

PCT Pub. Date: Aug. 24, 1995

[30] Foreign Application Priority Data

Feb. 22, 1994 [FR] France .................................. 94 02343

[51] Int. Cl.[6] .......................................................... F16L 9/14
[52] U.S. Cl. .......................... 138/141; 138/137; 138/140; 138/153
[58] Field of Search ...................... 138/141, 140, 138/153, DIG. 1, DIG. 10, 137, 138

[56] References Cited

U.S. PATENT DOCUMENTS 4,421,827 12/1983 Phillips .
4,593,853  6/1986 Schad et al. ........................ 138/141 X

FOREIGN PATENT DOCUMENTS

| 0 270 347 A1 | 6/1988 | European Pat. Off. . |
| 0 346 101 A2 | 12/1989 | European Pat. Off. . |
| 0 375 608 A1 | 6/1990 | European Pat. Off. . |
| 2 516 443 | 5/1983 | France . |
| 28 45 908 A1 | 5/1979 | Germany . |
| 30 16 134 A1 | 10/1981 | Germany . |
| 30 23 214 A1 | 3/1982 | Germany . |
| 31 04 161 A1 | 8/1982 | Germany . |
| 33 19 515 A1 | 11/1984 | Germany . |
| 92 08 705.1 | 9/1992 | Germany . |
| 2111164 | 6/1983 | United Kingdom . |
| 2 226 380 | 6/1990 | United Kingdom . |

*Primary Examiner*—William Stryjewski
*Attorney, Agent, or Firm*—Oliff & Berridge, PLC

[57] ABSTRACT

This composite pipe (20) is of the type including an inner tube (2) made of a first thermoplastic material (A), a reinforcement (21) including a metal tape (3) bonded to the inner tube by a first adhesive (61) compatible with the first thermoplastic material, an outer sheath (4) made of a second thermoplastic material (B), bonded to the reinforcement (21) by a second adhesive (62) compatible with the second thermoplastic material. According to the invention the two materials A and B have different chemical natures and, in the connecting region 22 between the strips opposite one another 61a, 62a, respectively, of the first and of the second adhesive, a means of bonding joins these two bands coherently. In an embodiment this means of bonding consists of adhesives which are different but compatible and co-crosslinked with each other.

13 Claims, 3 Drawing Sheets

COLD-FORMABLE COMPOSITE PIPE

BACKGROUND OF THE INVENTION

The present invention relates to a cold-formable composite pipe capable of constituting a pipework for conveying any fluid, such as water, gasoline, air or lubricant, especially under pressure.

In accordance with document EP-A-0,270,347 such a pipe has been described including, from the inside outward:

an inner tube obtained by extrusion, made of a first thermoplastic material, namely a technical polyamide, a reinforcement including a continuous metal tape surrounding the inner tube with overlapping of its edges, defining between them a connecting joint and thus forming a tubular metal sheath; said metal tape being bonded to the inner tube by a first adhesive, an outer sheath, obtained by extrusion, made of a second thermoplastic material which has a chemical nature which is different from that of the first thermoplastic material, in this case a polyethylene; this outer sheath is bonded to the reinforcement by a second adhesive which is compatible with the second thermoplastic material, in this case a copolymer of ethylene and of a monomer which has a reactive carboxylic group, whereby the joint places opposite one another a first inner strip of the first adhesive and a second inner strip of the second adhesive.

According to this document, in the configuration defined above, it is envisaged to use a first adhesive which is compatible with the first thermoplastic material (polyamide) while immediately noting that there already exist in the trade, under the name "Zetabon" (Dow Chemical Company's registered trademark), metal tapes coated on both sides with the adhesive chemically defined above, which is compatible with the second thermoplastic material (polyethylene) but not with the first thermoplastic material (polyamide). Nevertheless, when the "Zetabon" tape is used, this results either in abandoning an effective bond between the inner tube and the reinforcement, or in adopting for the inner tube a thermoplastic material of the same kind or identical with the second thermoplastic material, namely a polyethylene.

Whichever the case envisaged, the outcome according to the document EP-A-0,270,347 is a composite pipe with limited performance, especially in leakproofing or mechanical terms.

SUMMARY OF THE INVENTION

The subject of the present invention is therefore a composite pipe as defined above, of high performance, which can be employed especially for conveying all kinds of fluids, including volatile fluids, especially under pressure, and optionally at relatively high temperatures, for example above 100° C., this being done in very good conditions of, on the one hand, leakproofing and, on the other hand, mechanical strength or elasticity.

In accordance with the present invention, in a reinforcement joint placing opposite one another a first inner strip of a first adhesive and a second strip of a second adhesive, and in which the first adhesive is compatible with the first thermoplastic material and optionally identical with the second adhesive, the first and second inner strips of the joint which are bonded to each other are crosslinked or co-crosslinked chemically and thus form a coherent joint.

By virtue of the invention it becomes possible to employ two different thermoplastic materials, for the inner tube and the outer sheath respectively, including a "technical" one, for example, for the inner tube, while effectively bonding these two materials to the reinforcement, and this being done without compromising, or even by reinforcing, the leakproofing of the joint.

"Coherent" or "coherence" is intended to mean a junction which integrally unites the two inner strips of adhesive opposite the connecting joint of the reinforcement without discontinuity liable to result in a breakdown in the leaktightness of said joint.

A means of coherent bonding can be illustrated by the joining, for example by melting, of two identical materials.

By virtue of the present invention it becomes possible to choose an inner tube which is, on the one hand, relatively inert toward the conveyed fluids and, on the other hand, relatively resistant to pressure and to temperature, which is obtained, for example, using a technical thermoplastic material, for example a polyamide, and, on the other hand, an outer sheath differing from the outer tube, contributing only to the protection of the pipe and obtained, for example, using a less technical plastic material, for example a polyethylene, particularly filled with a flame-retardant filler.

According to the present invention the differentiation of the thermoplastic materials of the inner tube and of the outer sheath, respectively, does not compromise the leaktightness and the mechanical strength of the connecting joint of the reinforcement, by virtue of the coherence of the means of bonding, with regard to the adhesives adopted for the inner tube and the outer sheath.

All in all, the characteristics adopted according to the invention, cooperating with one another, make it possible to obtain a cold-formable, composite pipe of "universal" nature, in the sense that it directly permits a relatively safe transportation of all kinds of fluids, including relatively volatile fluids like, for example, gasoline or methanol.

BRIEF DESCRIPTION OF THE DRAWINGS

The present invention is now described by reference to the attached drawing, in which.

DETAILED DESCRIPTION

Figure 1:
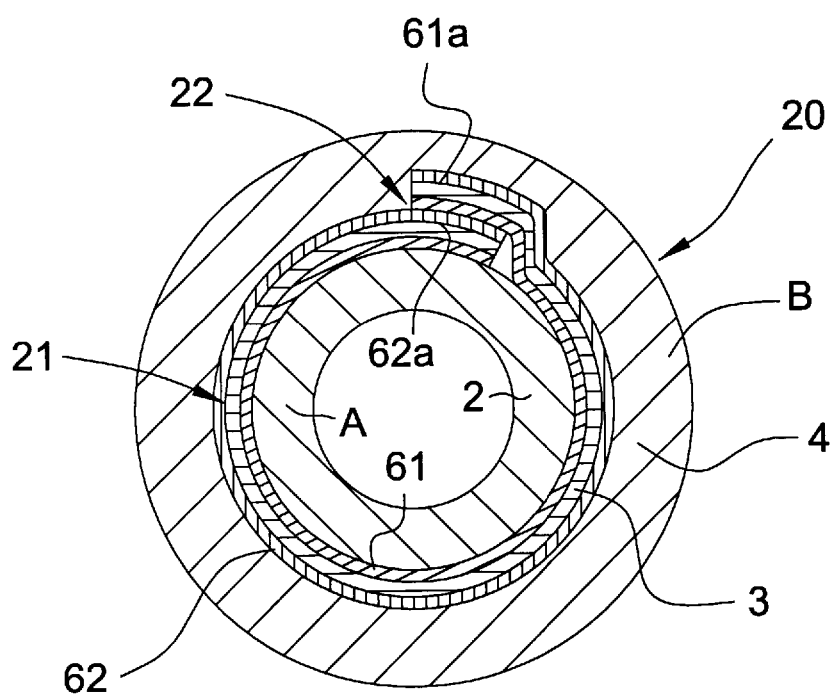
FIG. 1 is a view in cross section of a composite pipe according to the invention

In accordance with FIG. 1 a cold-formable, composite pipe 1 includes from the inside outward:

an inner tube 2 obtained by extrusion of a first thermoplastic material A, namely a technical polyamide a reinforcement 21 including a metal tape 3, for example of aluminum, fitted lengthwise around the inner tube 2, with overlapping of its lengthwise edges, defining a lengthwise connecting joint 22 between them, and thus forming a tubular metal sheath; the metal tape 3 is bonded to the inner tube by a first adhesive 61 compatible with the first thermoplastic material A an outer sheath 4 obtained by extrusion of a second thermoplastic material B, in this case an olefinic resin, for example an EVA polyethylene; this outer sheath is bonded to the reinforcement (21), obtained with the metal tape 3, by a second adhesive 62 compatible with the second thermoplastic material B.

Consequently, according to the invention, the first thermoplastic material A of the inner tube 2 has, as already seen, a chemical nature differing from the second thermoplastic material B of the outer sheath 4.

Still according to the invention, the metal tape 3, for example of aluminum, comprises, on one side, the first adhesive 61 and, on the other side, the second adhesive 62, whereby the joint 22 between the lengthwise overlapping edges of the metal tape 3 places opposite one another a first inner strip 61a of the first adhesive and a second inner strip 62a of the second adhesive.

According to the invention the connecting joint 22 connects coherently the two inner strips 61a and 62a of the connecting joint 22.

In accordance with the present invention various solutions may be adopted in order to have available a means of bonding of the joint 22, coherent with the inner strips 61a and 62a of adhesives:

1) the first adhesive 61 and the second adhesive 62 are identical with a single adhesive compatible with the first thermoplastic material A but relatively less compatible with the second thermoplastic material B; in this case the single adhesive is crosslinked. By way of example, the single adhesive is a crosslinked polyurethane, especially a urethane-acrylate copolymer 2) the first adhesive 61 and the second adhesive 62 are different and relatively poorly compatible with each other; in this case the first adhesive 61 and the second adhesive 62 are co-crosslinked with each other. By way of example, the first adhesive is a urethane-acrylate copolymer and the second adhesive an ethylene-acrylic acid copolymer.

"Compatible" or "compatibility" is intended to mean the fact that two materials in contact with each other, for example along a joint plane, are capable of forming a relatively strong homogeneous joint, which involves especially a relative migration of the two materials toward one another at their surface of contact. A person skilled in the art of glues and adhesives knows how to choose mutually compatible materials, especially in the knowledge of their respective chemical natures.

The crosslinking of the single adhesive, adopted according to the present invention, or of the first adhesive and/or of the second adhesive, still according to the present invention, makes it possible to compensate for any relative incompatibilities of the materials with each other, by contributing a good mechanical bonding and leaktightness of the joint 22.

The two adhesives 61 and 62 are preferably hot-melt adhesives, which means that, when cold, they are relatively inactive whereas, when heated, they exert their adhesiveness irreversibly, by melting and then solidifying. Such a property will in particular be useful and applied in the process of manufacture of a composite pipe according to the invention, described below.

The second thermoplastic material B of the outer sheath 4 is preferably crosslinked and, if appropriate, so is also the first thermoplastic material A of the inner tube 2. This crosslinking may be produced by any means which are well known to a competent person skilled in the art, such as irradiation under, for example, gamma radiation or incorporation of silane into the thermoplastic materials in question, with, for example, subsequent steam treatment.

The crosslinking is, of course, in each case adapted to the nature of the thermoplastic material employed and forming the inner tube or the outer sheath 4.

As will be seen below, this crosslinking makes it possible to fix definitively the shape of the composite pipe, for example of any unit component obtained by sectioning and then forming a length of pipe according to the invention.

The second thermoplastic material B is preferably co-crosslinked, with the single adhesive adopted according to the present invention, or the second adhesive also adopted according to another embodiment of the present invention. This choice appears, in particular, to be determining in order to ensure excellent cohesion between the outer sheath 4 and the reinforcement 21, which guarantees, in particular, the mechanical strength and the leaktightness of the composite pipe finally obtained.

The first and the second adhesive adopted according to the invention are, furthermore, compatible with the metal or metal alloy of the tape 3, so as also to ensure a relatively strong bonding where the latter is concerned.

In accordance with the embodiment of FIG. 1, the first adhesive 61 and the second adhesive 62 are identical with a single adhesive compatible with the first thermoplastic material A but less compatible with the second thermoplastic material B, and the means of bonding of the joint 22 then consists of a simple crosslinked junction between the two inner strips 61a and 62a.

Figure 2:
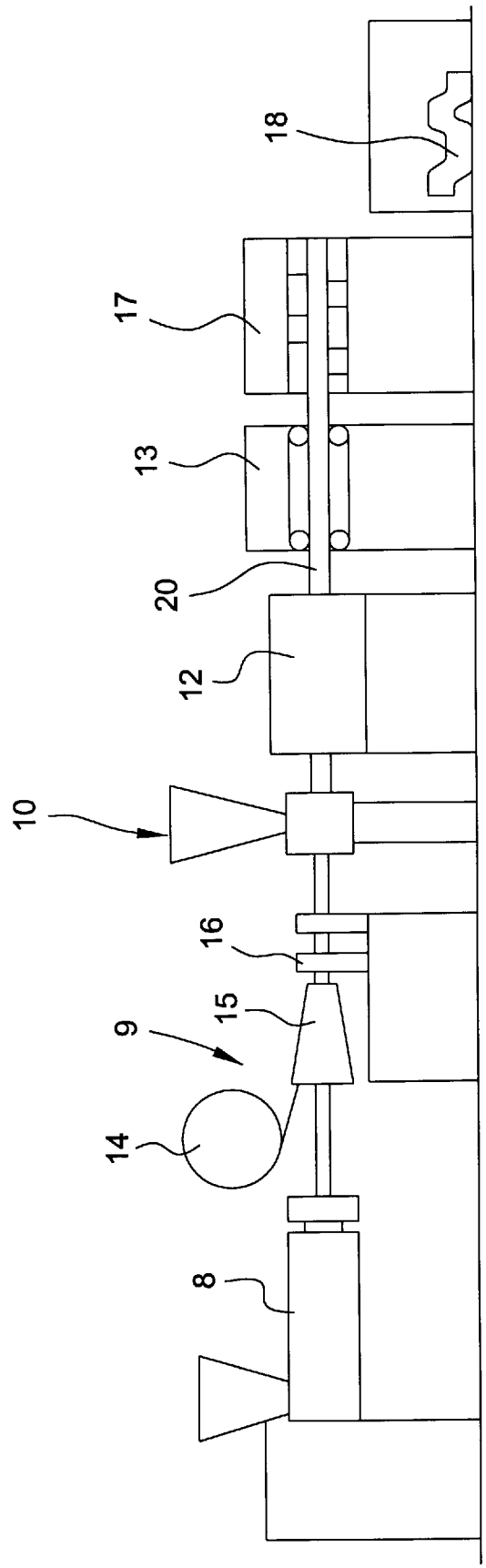
FIG. 2 is a diagrammatic view showing, on reduced scale, a production line for a pipe according to FIG. 1

As FIG. 2 shows, the plant for the manufacture of a unit component of cold-formable, composite pipe in accordance with the present invention includes, in the direction of manufacture of said unit component or pipe:

an extruder 8 forming the inner tube 2 in the first thermoplastic material A a device 9 for forming the reinforcement 21 from a continuous metal tape 3 an extruder 10 ensuring the formation of the outer sheath 4 in the second thermoplastic material B a cooling trough 12 and means 13 for hauling off the composite pipe thus obtained, for example a haul-off caterpillar.

In a manner known per se, the device 9 for forming the reinforcement 21 comprises a support for a reel 14 of metal tape 3, for example of aluminum, coated on its two faces with the first adhesive 61 and the second adhesive 62, respectively, both being hot-melt adhesives, and a forming adapter 15 forcing the tape to wrap the inner tube 2 in the direction of its length and producing the overlapping of its lengthwise edges.

Figure 3:
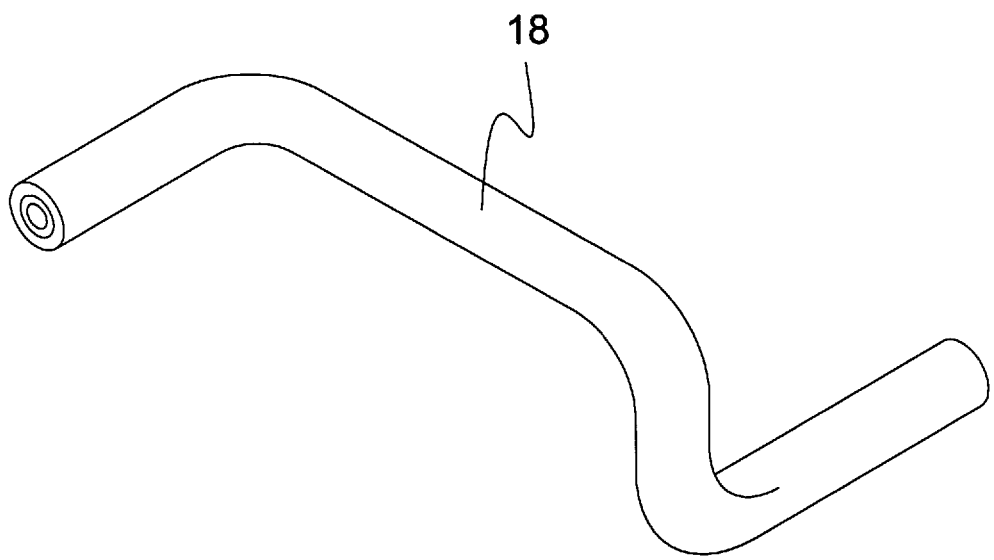
FIG. 3 is a view in perspective showing an embodiment of a unit length of pipe, obtained from a pipe according to the invention, cut and shaped as a function of its utilization.

For the production of composite pipes according to the embodiment of FIG. 3 the forming adapter 15 is followed by a sizing ring 16 which, by forcing the connecting joint 22 to become embedded in the hot and still malleable material of the inner tube 2, gives the reinforcement a cylindrical shape improving the leaktightness of the connecting joint 22.

Immediately after its extrusion the inner tube 2 is covered by the reinforcement 3 which itself is immediately covered by the outer sheath 4 originating from the extruder 10.

The heat energy of the first thermoplastic material A and also that of the second thermoplastic material B ensures the melting of the two layers of the heat-sensitive adhesives 61 and 62 and optionally their crosslinking. As a result, these two layers ensure a positive bonding of the inner tube 2 and of the outer sheath 4 with the metal reinforcement 3. Thus, on leaving the extruder 10, the tube-reinforcement-sheath composite forms a completely coherent composite, monolithic unit 20.

The composite pipe 20 is cooled in the trough 12, on leaving the haul-off caterpillar 13, and is either sectioned into lengths or wound on reels, or is directly formed by a forming device with rollers or the like, shown diagrammatically at 17.

In particular, by virtue of the high mechanical strength of the joint 22, and its relative elasticity, the forming of the composite pipe 20 entails less crushing of the latter, and in particular of the reinforcement; this forming also preserves the leaktightness of the composite pipe 20. This reinforcement ensures that the form imparted to the pipe is maintained until the following stage of crosslinking of the materials B and optionally A, constituting, respectively, the inner tube 2 and the outer sheath 4 and, optionally, of co-crosslinking of the second 62 and/or of the first adhesive 61. This crosslinking imparts a heat-curable behavior to at least one of the two materials A and B, which allows it to fix the pipe in the shape which it has been given; this shape thus becomes definitive and remains practically insensitive to the temperature changes or loads applied to the pipe.

Pipe unit components which have thus obtained their definitive shape and which can in particular be employed in the motor vehicle industry for conveying various fluids such as water, gasoline, air or lubricant, are shown under numerical reference 18.

The forming operation may be ensured continuously or, as above, on lengths of composite pipe which have been sectioned; in this latter case the shaping of the lengths may be performed immediately after the manufacture of the composite pipe, or subsequently after storage of the various lengths.

As FIG. 3 shows, the composite pipe 20 according to the invention makes it possible to produce shaped unit components 18 which have complex shapes, retaining in time the shape which they have been given, this being done at relatively low conversion cost.

Two examples of embodiment of the present invention are now described.

EXAMPLE NO. 1

The composite pipe consists:

of an inner tube (2) composed of a polyamide obtained by polycondensation of 11-aminoundecanoic acid, of thickness equal to 0.4 mm, of an aluminum tape (3) of 0.2 mm thickness, coated on both its faces with a crosslinkable hot-melt polyurethane acrylate polymer, with a softening temperature close to 130° C., and a thickness of 25 $\mu$m, of an outer sheath (4) consisting of a polyethylene filled with aluminum hydrate and halogenated derivatives needed for its flame-retardancy, of 1.4 mm mean thickness, taking the outer diameter of the composite pipe to 10 mm.

During the process defined above the polyurethane acrylate adhesive ensures a physical adhesive bonding with the flame-retarded outer polyethylene and a physicochemical bonding with the inner polyamide. At the end of the process the action gamma rays on the whole tube produces the simultaneous co-crosslinking of the adhesive and of the outer sheath 2 made of polyethylene. A satisfactory adhesion is thus obtained between the polyethylene and the aluminum sheet 3. The crosslinked polyurethane joint additionally contributes an excellent temperature behavior to the whole.

In the test conditions in force in the motor vehicle industry this type of composite tube offers a permeability to fuels of 0.39 g/m$^2$/h and a fire resistance of between 1 min 15 s and 1 min 30 s; the temperature resistance of this product allows it to be referenced in the 125° C. behavior classification.

EXAMPLE NO. 2

The composite pipe consists:

of an inner tube (2) composed of a polyamide obtained by polycondensation of 11-aminoundecanoic acid (or of 12-aminododecanoic acid), of thickness equal to 0.4 mm of an aluminum tape (3) of 0.2 mm thickness, coated:
  on the face in contact with the polyamide with a crosslinked hot-melt polyurethane adhesive of 25 $\mu$m thickness,
  on the face in contact with the polyethylene, against the tape, with a polyurethane acrylate adhesive of the same kind, of 25 $\mu$m thickness, on which a film of ethylene acrylic acid copolymer is immediately placed, of 20 $\mu$m thickness, of an external sheath (4) consisting of a polyethylene filled with aluminum hydrate and halogenated derivatives, needed for its flame retardancy, of 1.4 mm mean thickness; taking the external diameter of the composite tube to 10 mm.

The polyurethane acrylate and the ethylene acrylic acid copolymer ensure a physicochemical bonding respectively with the plastic materials with which they are in contact, and with each other, in order to constitute a homogeneous composite tube.

In this state the permeability to fuels is measured at 0.40 g/m$^2$/h and the fire resistance is established between 1 min and 1 min 10 s. With regard to its temperature resistance, the pipe may be classified as 100° C.

If the pipe is subjected to the action of gamma rays (as a result of the crosslinking of the polymers which are chosen to be reactive towards fast electrons), the permeability remains unchanged, the fire resistance is raised to 1 min 30 s; its improved temperature behavior takes it into the 125° C. classification.

We claim:

1. A cold-formable composite pipe including from the inside outward an inner tube, made of a first thermoplastic material, obtained by extrusion a reinforcement including a continuous metal tape surrounding the inner tube with overlapping of its edges while defining a connecting joint between them, and thus forming a tubular metal sheath, said metal tape being bonded to the inner tube by a first adhesive, an outer sheath, made of a second thermoplastic material which has a chemical nature which is different from that of the first thermoplastic material, obtained by extrusion, bonded to the reinforcement by a second adhesive compatible with the second thermoplastic material, whereby the joint places opposite one another a first inner strip of the first adhesive and a second inner strip of the second adhesive, the first adhesive being compatible with the first thermoplastic material, wherein the first and second inner strips of the joint, which are bonded to each other, are crosslinked or co-crosslinked chemically and thus form a coherent bond.

2. The pipe as claimed in claim 1, wherein the first adhesive and the second adhesive are identical with a single adhesive compatible with the first thermoplastic material but less compatible with the second thermoplastic material, and said single adhesive is crosslinked between the inner strips.

3. The pipe as claimed in claim 2, wherein the single adhesive is a polyurethane.

4. The pipe as claimed in claim 3, wherein the single adhesive is a urethane acrylate copolymer.

5. The pipe as claimed in claim 2, wherein the single adhesive is co-crosslinked with the second thermoplastic material.

6. The pipe as claimed in claim 1, wherein the first adhesive and the second adhesive are different, relatively poorly compatible with each other and are co-crosslinked between the inner strips.

7. The pipe as claimed in claim 6, wherein the first adhesive is a urethane-acrylate copolymer and the second adhesive an ethylene-acrylic acid copolymer.

8. The pipe as claimed in claim 1, wherein both adhesives are hot-melt adhesives.

9. The pipe as claimed in claim 1, wherein the first adhesive is identical to the second adhesive.

10. A process for the manufacture of a cold-formable composite pipe, comprising:

a) extruding an inner tube made of a first thermoplastic material, b) forming a reinforcement from a continuous metal tape with overlapping of its edges defining a connecting joint between them, thus obtaining a tubular metal sheath, c) extruding an outer sheath made of a second thermoplastic material which has a chemical nature differing from the first thermoplastic material, d) coating the metal tape on one side with a first adhesive and, on the other side, with a second adhesive compatible with the second thermoplastic material, wherein the coating step places a first inner strip of the first adhesive opposite a second inner strip of the second adhesive and bonds the reinforcement to the inner tube and to the other sheath wherein the coating step further comprises chemical crosslinking or co-crosslinking of the inner adhesive strips which are bonded to one another at the connecting joint of the reinforcement, and sufficient to obtain a coherent bonding of said joint.

11. The process of claim 10, wherein the coating step further comprises selecting the first adhesive that is crosslinkable with the first thermoplastic material.

12. The process of claim 10, wherein the coating step further comprises selecting the second adhesive that is crosslinkable with the second thermoplastic material.

13. The process of claim 10, wherein the coating step further comprises selecting the first adhesive that is identical to the second adhesive.

* * * * *